United States Patent [19]

DiRisio et al.

[11] Patent Number: 5,432,585
[45] Date of Patent: Jul. 11, 1995

[54] IMPROVED FLASH LOCKOUT

[75] Inventors: Anthony DiRisio, Rochester; John A. Marino, Conesus; Jude A. SanGregory, Spencerport; Craig A. Baker, Marion, all of N.Y.

[73] Assignee: Eastman Kodak Company, Rochester, N.Y.

[21] Appl. No.: 114,889

[22] Filed: Aug. 31, 1993

[51] Int. Cl.⁶ .............................................. G03B 15/05
[52] U.S. Cl. ................... 354/418; 354/127.1; 354/268
[58] Field of Search ............... 354/413, 418, 420–423, 354/127.1, 127.11, 127.12, 266, 267.1, 268, 269

[56] References Cited

U.S. PATENT DOCUMENTS

| | | | |
|---|---|---|---|
| 2,336,277 | 12/1943 | Mihalyi | 95/31 |
| 3,938,169 | 2/1976 | Kitai | 354/268 |
| 4,027,317 | 5/1977 | Hauser et al. | 354/289 |
| 4,124,857 | 11/1978 | Hauser et al. | 354/198 |
| 4,135,797 | 1/1979 | Ohmura et al. | 354/128 |
| 4,214,827 | 7/1980 | Tominaga et al. | 354/127 |
| 4,269,489 | 5/1981 | Takimoto | 352/174 |
| 4,269,494 | 5/1981 | Shiozawa et al. | 354/60 L |
| 4,322,143 | 3/1982 | Mailauder | 354/145.1 |
| 4,332,451 | 6/1982 | Ichii | 354/234 |
| 4,396,269 | 8/1983 | Watanabe | 354/235 |
| 4,464,031 | 8/1984 | Iwashita et al. | 354/268 |
| 4,470,684 | 9/1984 | Harvey | 354/413 |
| 4,501,481 | 2/1985 | Kataoka et al. | 354/413 |
| 4,544,254 | 10/1985 | Egawa et al. | 354/403 |
| 4,569,580 | 2/1986 | Kataoka et al. | 354/415 |
| 4,615,599 | 10/1986 | Kataoka et al. | 354/415 |
| 4,799,078 | 1/1989 | Hayama | 354/412 |
| 4,924,149 | 5/1990 | Nishida et al. | 354/127.11 |
| 5,109,244 | 4/1992 | Otani et al. | 354/127.11 |
| 5,132,718 | 7/1992 | Fujino et al. | 354/413 |
| 5,250,978 | 10/1993 | Ogawa | 354/418 |

FOREIGN PATENT DOCUMENTS 2349385 10/1973 Germany .
58-4123 1/1983 Japan .

Primary Examiner—Russell E. Adams
Attorney, Agent, or Firm—Heslin and Rothenberg; Wayne F. Reinke

[57] ABSTRACT

A camera locks out an attempted flash photograph when the voltage of the flash charger is below a minimum voltage necessary for the flash to fire. Flash lockout may also take place when: the flash charger voltage is equal to or greater than the minimum flash voltage but less than the lowest voltage in a voltage range providing optimum flash lighting; and the photographic subject distance is beyond the flash range at the present flash charger voltage. Lockout may also be determined based on current flash charger charging time compared to predetermined times for the flash charger to reach the minimum voltage and/or the lowest voltage in the optimum lighting range from a substantially discharged state.

8 Claims, 3 Drawing Sheets

IMPROVED FLASH LOCKOUT

BACKGROUND OF THE INVENTION

Technical Field

The present invention generally relates to cameras. More particularly, the present invention relates to cameras that do not allow a flash photograph to be taken until the flash charger reaches a predetermined voltage.

Background Art

Many cameras today have features which help prevent or lockout underexposed photographs from being taken. One such feature, known as "flash lockout" prevents the user from taking a photo where a flash is necessary, until the flash charger has charged to an acceptable voltage. Reaching the acceptable voltage has been termed "ready light", since many cameras have a light for indicating when the acceptable voltage has been reached. In the past, ready light has occurred between full charge and a charge corresponding to a half stop down from full charge, even though the flash will generally fire at a voltage below traditional ready light.

Although traditional flash lockout helps reduce poor quality photos, it also prevents photos from being taken at times when the flash would actually fire and provide adequate or acceptable lighting.

Thus, a need exists for a camera with a flash lockout feature that takes advantage of the fact that a flash may fire at a significantly lower voltage than traditional ready light.

SUMMARY OF THE INVENTION

Briefly, the present invention satisfies the need for a camera with a flash lockout feature that does not unnecessarily lock out photos by providing for flash lockout if either the flash charger is charged below a minimum voltage necessary for the flash to fire, or the flash charger voltage is at or above the minimum voltage but below ready light and the photo subject is beyond the flash range at the present voltage.

In a first aspect of the present invention, a camera is provided with a flash, a flash charger, a means for measuring a voltage of the flash charger, a shutter, a means for initiating synchronized release of the shutter and attempted firing of the flash and a means for providing flash lockout only if the flash charger voltage is presently less than a minimum voltage required by the flash for firing.

In a second aspect of the present invention, a camera is provided with a flash, a flash charger, a means for measuring a voltage of the flash charger, a shutter, a means for initiating synchronized release of the shutter and attempted firing of the flash, a means for measuring the distance a photographic subject is from the camera and a means for providing flash lockout if: the present flash-charger voltage is equal to or greater than a minimum voltage required by the flash for firing but less than the lowest voltage in a voltage range providing optimum flash lighting; and the subject distance is beyond the flash distance at the present flash charger voltage.

In a third aspect of the present invention, a camera is provided with a flash, a flash charger, a shutter, a timer for tracking current charging time, a means for initiating synchronized release of the shutter and attempted firing of the flash and means for providing flash lockout when the current time is less than a predetermined minimum time for the flash charger to charge from a substantially discharged state to a minimum voltage required by the flash for firing.

In a fourth aspect of the present invention, a camera constructed according to the third aspect is provided also including a means for measuring the distance of a photographic subject from the camera, and the lockout means also provides flash lockout when: the current time is equal to or greater than the minimum time, but less than the shortest charging time from the substantially discharged state in a time range corresponding to a flash-charger voltage range providing optimum flash lighting; and the subject distance is beyond the flash distance at the current flash-charger voltage.

In a fifth aspect of the present invention, a flash lockout method is provided for a camera with a shutter, a flash, a flash charger, a voltage measuring device for measuring a present voltage of the flash charger and a shutter-release/flash-firing initiator. Initially, the flash charger is started. Then, in response to activation of the initiator, the present voltage is read. If the voltage is less than a minimum voltage the flash needs for firing, flash lockout takes place.

In a sixth aspect of the present invention, a flash lockout method is provided for a camera with a shutter, a flash, a flash charger, a voltage measuring device for measuring a present voltage of the flash charger, a means for measuring the distance of a photographic subject from the camera and a shutter-release/flash-firing initiator. Initially, the flash charger is started. Then, in response to activation of the initiator, the present voltage is read. If the present voltage is equal to or greater than a minimum voltage the flash needs for firing, but less than the lowest voltage in a flash-charger voltage range providing optimum flash lighting, the distance is read. If the subject distance is farther than the flash distance at the present flash charger voltage, then flash lockout takes place.

In a seventh aspect of the present invention, a flash lockout method is provided for a camera with a shutter, a flash, a flash charger, a timer for measuring a current charging time of the flash charger from a substantially discharged state and a shutter-release/flash-firing initiator. Initially, the flash charger and timer are synchronously started. The timer is then read in response to activation of the shutter-release/flash-firing initiator and compared to a predetermined minimum charging time for said flash charger to charge from the substantially discharged state to a minimum voltage required by the flash for firing. If the timer reading is less than the minimum charging time, flash lockout takes place.

In an eighth aspect of the present invention, a flash lockout method is provided for a camera with a shutter, a flash, a flash charger, a timer for measuring a current charging time of the flash charger from a substantially discharged state, a distance measuring device for measuring a distance of a photographic subject from the camera and a shutter-release/flash-firing initiator. Initially, the flash charger and timer are synchronously started. The flash charger has a first charging time to charge from the substantially discharged state to a minimum voltage required by the flash for firing, and a second charging time for said flash charger to charge from the substantially discharged state to a minimum optimum-light voltage between the minimum voltage and a maximum flash-charger voltage. Then, in response to activation of the shutter-release/flash-firing initiator, the timer is read. If the timer reading is equal to or greater than the first charging time, but less than the second charging time, then the distance is read. If the distance is beyond the flash range at a flash charger voltage corresponding to the timer reading, then flash lockout takes place.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
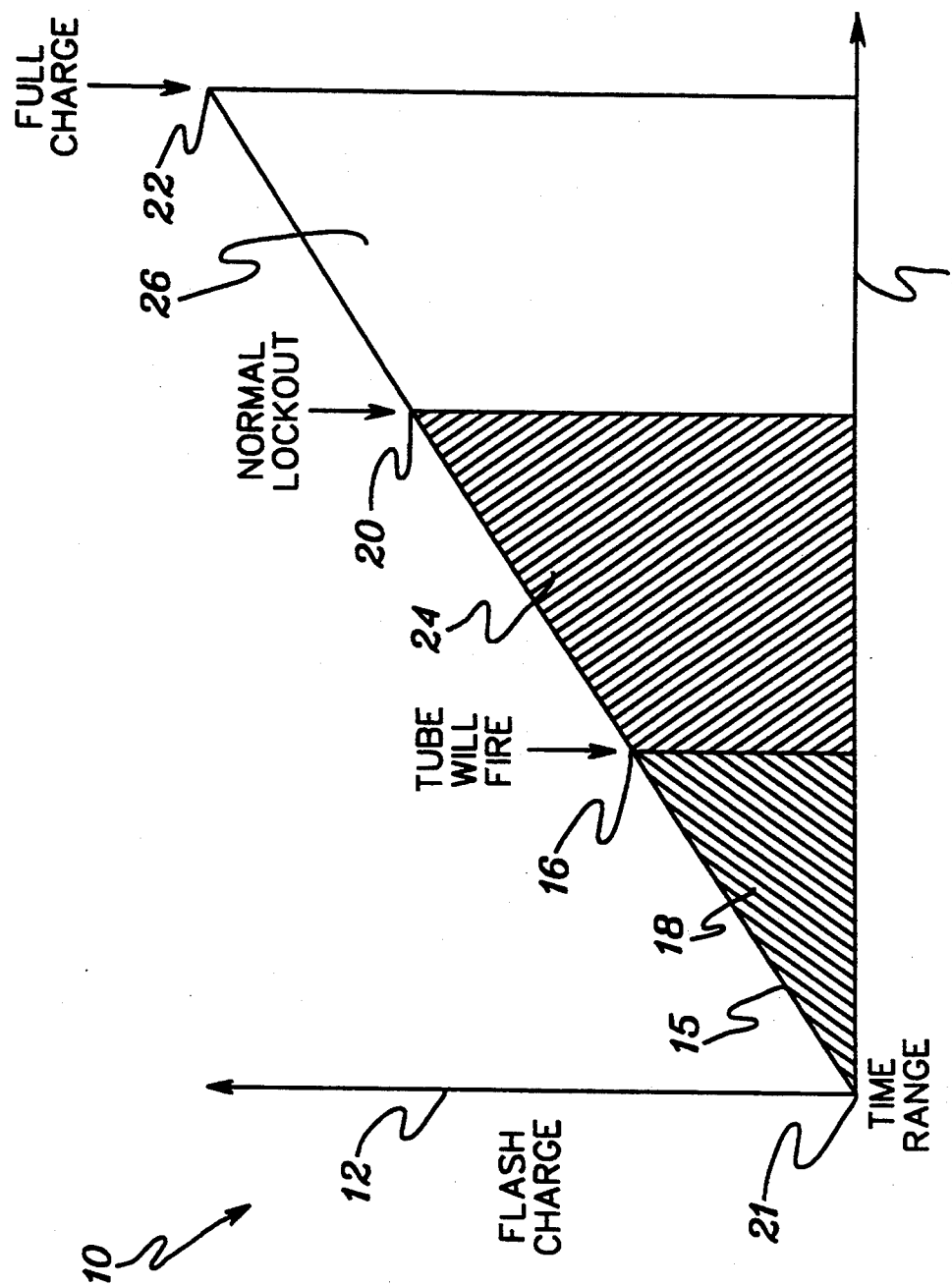
FIG. 1 is an approximated graphical representation of flash charging time and flash distance plotted against flash charge.

Flash tubes used in automatic flash cameras, such as xenon gas filled tubes, have three regions of operation. FIG. 1 graphically approximates these three regions for a given flash tube. Graph 10 plots flash charger voltage on the Y-axis 12 against charge time and flash distance on the X-axis 14. Although flash charger voltage and charging time do not necessarily have a linear relationship, if, for example, a capacitor is used as the flash charger, the relationship can be approximated linearly. The flash distance is the maximum distance the flash will illuminate the scene for acceptable exposure at a given voltage. A straight line 15 joins points 16, 20 and 22 to the origin 21. Line 15 approximates charge time and flash distance at a given flash charger voltage.

Point 16 represents a minimum voltage required by the flash for firing and the associated charging time, as well as the corresponding flash distance. Area 18 under line 15 thus represents the conditions under which the flash will not fire, due to insufficient voltage. Point 20 represents the ready light condition. At voltages in area 26, from ready light 20 to point 22, the maximum flash charger voltage, the flash is considered to produce optimum lighting for most photos, except those beyond the maximum range of the flash at full charge giving proper film exposure. Thus, area 24 under line 15 represents the conditions under which the flash will fire, but may or may not produce optimum lighting, depending on the distance of the subject from the camera and the present voltage of the flash charger.

In the past, cameras have been designed to provide flash lockout when present conditions fall outside area 26. Flash lockout outside area 26 helps ensure proper exposure. However, locking out photos under the conditions in area 24 prevents photos with potentially proper exposure or photos with less than optimum exposure, but nonetheless acceptable to the photographer. The present invention takes advantage of the fact that many flash tubes will fire at voltages significantly lower than conventional ready light, and have a threshold voltage needed for firing.

Figure 2:
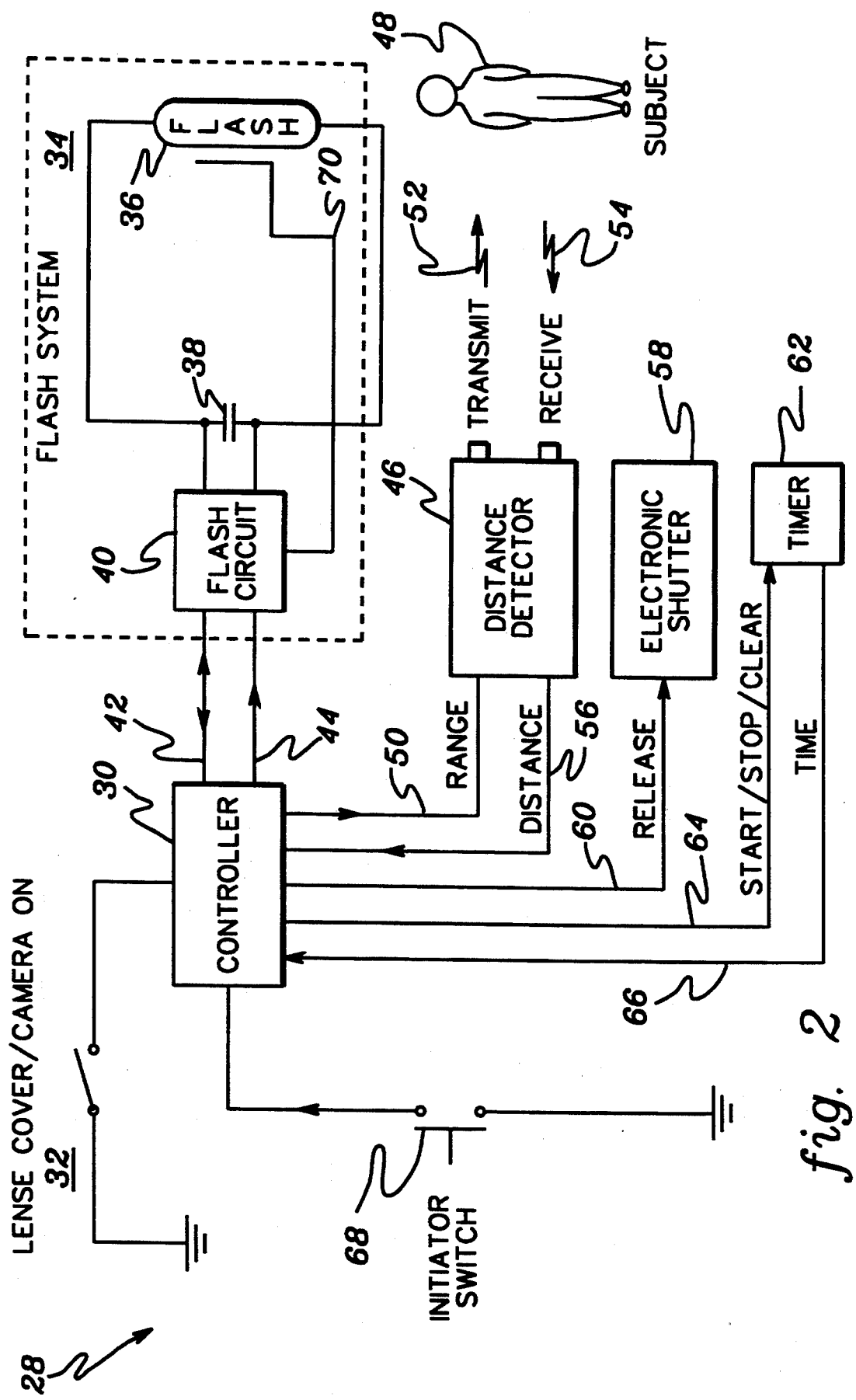
FIG. 2 is a block diagram representation of a portion of a camera providing flash lockout according to the present invention.

FIG. 2 is a block diagram of a camera portion 28 providing flash lockout according to the present invention. It will be understood that although the present invention will be described with reference to FIG. 2, the invention could be implemented by one of ordinary skill in the art on cameras of differing designs.

Camera portion 28 includes lens cover/camera on switch 32, initiator switch 68, controller 30, timer 62, electronic shutter 58, distance detector 46, flash circuit 40, capacitor 38, flash 36 and subject 48. The operation and interaction of the elements of camera portion 28 will now be described.

Controller 30 controls the operation of the other elements in FIG. 2. Controller 30 could be, for example, a general purpose microprocessor programmed to operate the camera or an ASIC (application specific integrated circuit) controller designed to operate the camera. When a user closes lens cover switch 32 (i.e., opens the lens cover (not shown)) or otherwise turns the camera on, controller 30 is turned on.

Flash system 34 comprises xenon gas filled flash tube 36, flash capacitor 38 and flash circuit 40. Flash capacitor 38 provides the voltage necessary across flash tube 36 for firing. Flash tube 36 also requires a voltage applied along line 70. The voltage along line 70 is typically thousands of volts, versus hundreds of volts across the ends of tube 36. The voltages could be supplied, for example, by a transformer with appropriate windings (not shown). Flash circuit 40 charges capacitor 38 and controls firing of flash tube 36, as well as measuring of the present voltage of capacitor 38, based on signals received from controller 30 over lines 42 and 44. In the context of the present embodiment, the "flash charger" comprises flash circuit 40 and capacitor 38. Line 42 is a two-way information path; flash circuit 40 providing the present voltage of capacitor 38 to controller 30 thereon, as well as starting and stopping the charging of capacitor 38 based on commands received thereon from controller 30. Controller 30 sends the start-charging command when lens cover switch 32 is closed over line 42 as well as a stop-charging command and a voltage inquiry. Line 44 is a one-way command path for controller 30 to send a fire command to flash circuit 40.

Distance detector 46 determines the distance of a photographic subject from the camera. Upon receiving a detect command from controller 30 over line 50, distance detector 46 transmits a distancing signal 52, which bounces off subject 48 and returns to detector 46 as return signal 54. Various suitable distance detectors operating on optical or radar principles are well known in the art. Once distance detector 46 has determined the distance of subject 48, the information is sent back to controller 30 over line 56. It will be understood that although not necessary for the present invention, distance detector 46 could be part of an automatic focusing system.

Electronic shutter 58 briefly opens in response to a release command from controller 30 over line 60. Release of shutter 58 and firing of flash tube 36 happen synchronously. Timer 62 keeps track of charging time for capacitor 38. It will be understood that timer 62 could also be part of flash circuit 40. Timer 62 starts timing, stops timing and clears itself based on commands received over line 64 from controller 30. Thus, the start-charging command sent to flash circuit 40 is synchronized with the start-timer command. Upon receipt of the stop command, timer 62 sends the present time information back to controller 30 on line 66. As will be explained in greater detail hereafter, flash circuit 40 need not be capable of measuring and reporting the voltage across capacitor 38 when timer 62 is present in camera portion 28.

Closure of initiator switch 68 causes controller 30 to issue the shutter release and flash firing commands, unless controller 30 determines that the conditions for flash lockout are present. Flash lockout according to the present invention, with reference to FIG. 2, will now be described. The description of the operation of camera portion 28 assumes lens cover switch 32 has been closed, a decision has been made that a flash is necessary for proper exposure and capacitor 38 has begun charging. The same conditions apply where a photo has just been taken.

The following description of a first aspect of the invention does not require timer 62. In the first aspect, closure of switch 68 causes controller 30 to inquire of flash circuit 40 as to the present voltage across capacitor 38. If the voltage is below the minimum voltage required by the particular type of tube for firing (point 16 in FIG. 1), controller 30 locks out the attempted photo by not sending the fire and release signals. It will be understood that for a particular type of flash tube, testing may need to be done to arrive at a minimum voltage for firing. If the present voltage across capacitor 38 is equal to or higher than the ready light voltage for xenon tube 36 (point 20 in FIG. 1), the fire and release commands are sent by controller 30.

If the voltage across capacitor 38 is equal to the minimum tube-firing voltage (point 16 in FIG. 1) or is between that minimum voltage and the ready light voltage (area 24 in FIG. 1), controller 30 sends a stop-charging command to flash circuit 40 on line 42. The stop-charging command is sent due to the extreme electrical noise generated by the charging of capacitor 38. Controller 30 then commands distance detector 46 to determine the distance of subject 48. Upon receipt of the distance information, controller 30 determines if subject 48 is beyond the range of flash 36 at the present voltage of capacitor 38. If subject 48 is beyond the current flash range, controller 30 will lock out the photograph. If subject 48 is within the current flash range, controller 30 will issue the fire and release commands.

Flash circuit 40, controller 30 and distance detector 46, in accordance with the above description, can be readily implemented, using commonly employed components, by one of ordinary skill in the art.

In the following description of another aspect of the present invention, measuring of the flash-charger voltage is replaced by keeping track of charging time from a substantially discharged state, assuming times for capacitor 36 to reach the minimum firing voltage and the ready light voltage are known. Such times could be, for example, average times obtained through experimentation. In the context of the present embodiment, a "substantially discharged state" refers to both a time when the camera is turned on and just after firing of the flash. As is known in the art, a capacitor, after being charged for the first time, will always retain a residual charge, even after a period of time of nonuse.

Upon closure of lens cover switch 32, controller 30 sends a clear and then start-timing commands to timer 62, as well as the start-charging command to flash circuit 40 synchronously with the start-timing command. When switch 68 is closed (i.e., an attempted photo), controller 30 synchronously sends the stop-charging command to flash circuit 40 and the stop-timing command to timer 62, after which timer 62 sends the current charge time to controller 30. If the current charge time is less than a minimum time corresponding to a time for capacitor 38 to reach the minimum tube-firing voltage, controller 30 locks out the attempted photo by not sending the fire and release commands. If the present charge time is equal to the minimum time, or is between the minimum time and a ready light time, controller 30 will cause distance detector 46 to determine the distance of subject 48 in the manner previously described. If subject 48 is beyond the current flash range, lockout will occur, and controller 30 will cause flash circuit 40 to resume charging capacitor 38 and timer 62 to resume timing. If subject 48 is within the current flash range, controller 30 will synchronously send the time-clear command over line 64, the release command over line 60 and the fire command over line 44. After firing tube 36 and releasing shutter 58, controller 30 sends the start-charging command to flash circuit 40 and the start-timing command to timer 62 in anticipation of another photo attempt. If the present charge time is equal to or greater than the ready light time, then the fire and release commands are sent.

Figure 3:
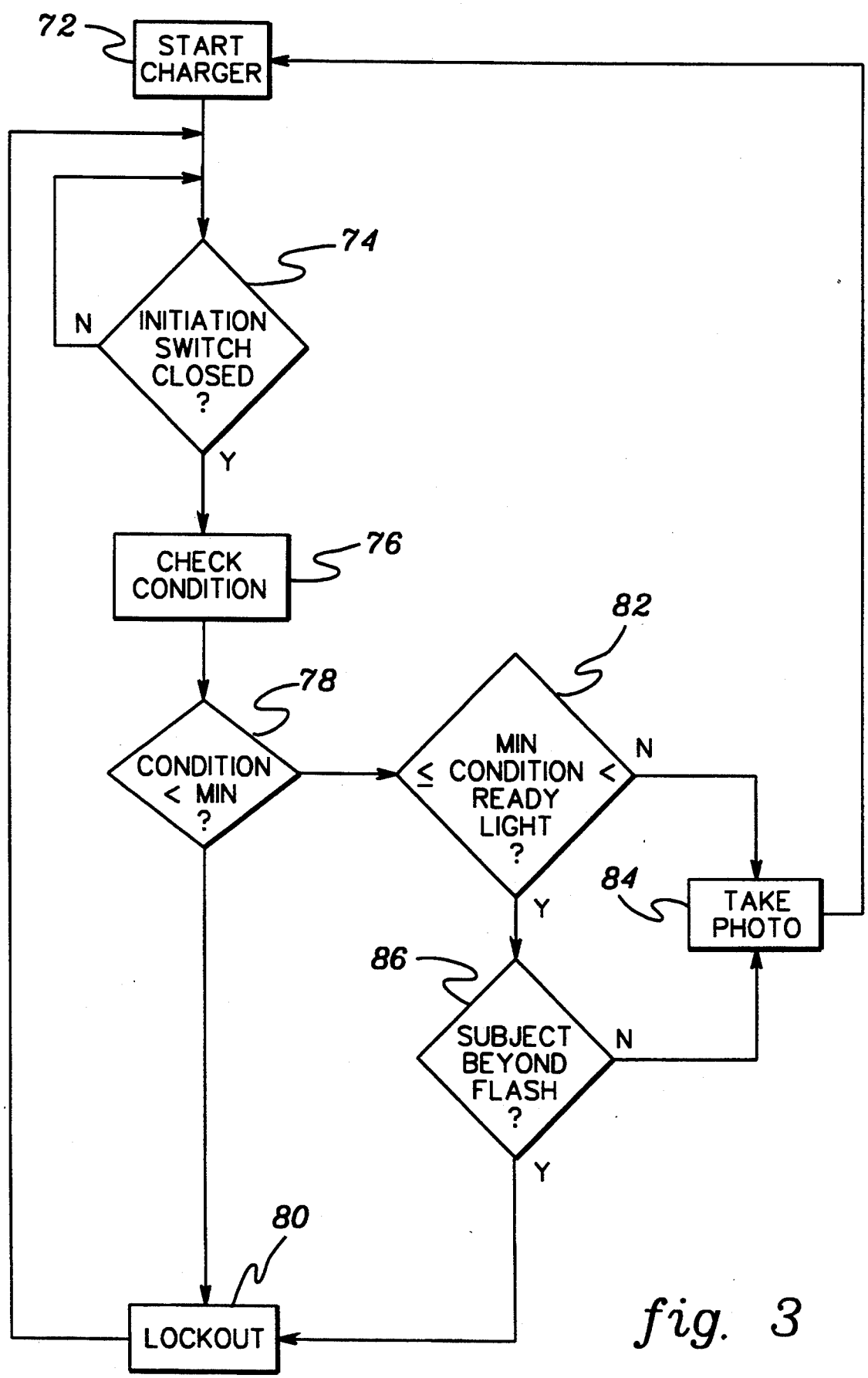
FIG. 3 is a flow diagram of a method for flash lockout according to the present invention.

FIG. 3 is a flow diagram of a method of the present invention for locking out a photograph in a flash photograph situation with an automatic flash camera. The method will be described with reference to camera portion 28 in FIG. 2. The method begins at a point where capacitor 38 is in a substantially discharged state and is beginning to be charged by flash circuit 40 (STEP 72 "START CHARGER"). Next, an inquiry is made as to whether switch 68 has been closed (INQUIRY 74 "INITIATION SWITCH CLOSED?"). If switch 68 has not been closed, a wait state is entered wherein the switch-closing inquiry is repeated continuously. When switch 68 has been closed, a predetermined lockout condition is checked (STEP 76 "CHECK CONDITION"). The lockout condition is correlated to areas 18, 24 and 26 of FIG. 1, and in this example can be either the voltage across capacitor 38, or charge time from timer 62. The lockout condition is first checked to determine if it corresponds to the conditions in area 18 (INQUIRY 78 "CONDITION <MIN?"). If so, then flash lockout is provided for. In this case, if the voltage across capacitor 38 is below the minimum flash-firing voltage, or timer 62 shows a time less than a predetermined time for capacitor 38 to reach the minimum flash-firing voltage, then controller 30 will provide flash lockout. If the lockout condition does not fall within area 18, then it is checked against area 24, including the boundary between areas 18 and 24 (INQUIRY 82 "MIN ≦CONDITION <READY LIGHT?"). In relation to FIG. 2, area 24 and the boundary between areas 18 and 24 correspond to a voltage across capacitor 38 of between the minimum flash-firing voltage and the ready-light voltage, including the minimum flash-firing voltage. If the lockout condition does not fall within either areas 18 and 24 or the boundary between them, then the condition is assumed to be in the normal flash operation area 26, and a flash photo is taken (STEP 84 "TAKE PHOTO"). For FIG. 2, this means firing flash tube 36 and releasing shutter 58 substantially simultaneously. If the lockout condition is within area 24 or on the boundary between areas 18 and 24, the distance of the subject is checked to determine if the subject is beyond the present range of the flash (INQUIRY 86 "SUBJECT BEYOND FLASH?"). If the subject is beyond the current flash range, lockout occurs (STEP 80 "LOCKOUT"); if not, a flash photo is taken (STEP 84 "TAKE PHOTO"). With respect to FIG. 2, distance detector 46 determines the distance of subject 48 upon command from controller 30 and reports to same. If the distance is beyond the current flash range, interpreted from either the present voltage across capacitor 38 or the present time of timer 62 in the manner previously described, controller 30 will lock out the photo. If the subject distance is at the limit of or within the current flash range, the fire and release signals will be issued as previously described. After lockout (STEP 80), the method returns to the switch inquiry (INQUIRY 74). After a photo is taken (STEP 84), the method returns to the beginning (STEP 72).

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A camera, comprising:
   a flash;
   a flash charger;
   means for measuring a present voltage of said flash charger;
   a shutter;
   means for measuring a distance of a photographic subject from said camera;
   means for initiating synchronized release of said shutter and attempted firing of said flash;
   means for locking out said release of said shutter and said attempted firing of said flash in response to activation of said initiating means if:
   said present voltage is equal to or greater than a minimum voltage required by said flash for firing but less than a predetermined voltage between said minimum voltage and a maximum flash-charger voltage, wherein said flash produces optimum lighting at voltages in a voltage range between and including said predetermined voltage and said maximum flash-charger voltage, and
   said distance is greater than a maximum flash distance at said present voltage.

2. A camera according to claim 1, wherein said locking out means further comprises means for locking out said release of said shutter and said attempted firing of said flash in response to activation of said initiating means if said present voltage is less than said minimum voltage.

3. A camera, comprising:
   a flash;
   a flash charger;
   a shutter;
   timing means for measuring a current charging time, wherein a first time corresponds to a predetermined time for said flash charger to charge from a substantially discharged state to a minimum voltage required by said flash for firing,
   means for initiating synchronized release of said shutter and attempted firing of said flash; and
   means for locking out said release of said shutter and said attempted firing of said flash in response to activation of said initiating means only if said current charging time is less than said first time.

4. A camera, comprising:
   a flash;
   a flash charger;
   a shutter;
   means for measuring a distance of a photographic subject from said camera;
   timing means for measuring a current charging time of said flash charger, wherein a first time corresponds to a predetermined time for said flash charger to charge from a substantially discharged state to a minimum voltage required by said flash for firing, and wherein a second time corresponds to a predetermined time for said flash charger to charge from said substantially discharged state to a minimum optimum-light voltage between said minimum voltage and a maximum flash-charger voltage;
   means for initiating synchronized release of said shutter and attempted firing of said flash; and
   means for locking out said release of said shutter and said attempted firing of said flash in response to activation of said initiating means if:
   said current charging time is equal to or greater than said first time but less than said second time, and
   said distance is greater than a maximum flash distance at a flash-charger voltage corresponding to said current charging time.

5. A camera according to claim 4, wherein said locking out means further comprises means for locking out said release of said shutter and said attempted firing of said flash in response to activation of said initiating means if said current charging time is less than said first time.

6. A method for locking out shutter release in a camera including a flash, a flash charger, a voltage measuring device for measuring a present voltage of said flash charger, a shutter, a distance-measuring device for measuring a distance of a photographic subject from said camera and a shutter-release/flash-firing initiator, said method comprising the steps of:
   starting to charge said flash charger;
   reading said present voltage in response to activation of said shutter-release/flash-firing initiator;
   reading said distance if said present voltage is equal to or greater than a minimum voltage required by said flash for firing but less than a predetermined voltage between said minimum voltage and a maximum flash-charger voltage, wherein said flash produces optimum lighting at voltages in a voltage range between and including said predetermined voltage and said maximum flash-charger voltage; and
   locking out said shutter release if said present voltage is equal to or greater than said minimum voltage and said distance is greater than a maximum flash distance at said present voltage.

7. A method for locking out shutter release in a flash photograph situation with a camera including a shutter, a flash, a flash charger, a timer for measuring a current charging time of said flash charger, and a shutter-release/flash-firing initiator, said method comprising the steps of:
   synchronously starting to charge said flash charger and starting said timer;
   reading said timer in response to activation of said shutter-release/flash-firing initiator; and
   locking out said shutter release if said timer reading is less than a minimum charging time required by said flash for firing.

8. A method for locking out shutter release in a flash photograph situation with a camera including a shutter, a flash, a flash charger, a timer for measuring a current charging time of said flash charger, a distance measuring device for measuring a distance of a photographic subject from said camera and a shutter-release/flash-firing initiator, said method comprising the steps of:

synchronously starting to charge said flash charger and starting said timer;

reading said timer in response to activation of said shutter-release/flash-firing initiator;

reading said distance if said timer reading is equal to or greater than a first charging time for said flash charger to charge from a substantially discharged state to a minimum voltage required by said flash for firing; and locking out said shutter release if: said timer reading is equal to or greater than said first charging time but less than a second charging time for said flash charger to charge from said substantially discharged state to a minimum optimum-light voltage between said minimum voltage and a maximum flash-charger voltage, and said distance is greater than a maximum flash distance corresponding to a flash-charger voltage at said timer reading.

* * * * *